US011729660B2

(12) United States Patent
Kim et al.

(10) Patent No.: US 11,729,660 B2
(45) Date of Patent: Aug. 15, 2023

(54) 5G SYSTEM OPERATING AS TSN BRIDGE AND TRAFFIC TRANSMISSION METHOD

(71) Applicant: ELECTRONICS AND TELECOMMUNICATIONS RESEARCH INSTITUTE, Daejeon (KR)

(72) Inventors: Changki Kim, Daejeon (KR); Yoo Hwa Kang, Daejeon (KR); Taesik Cheung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 5 days.

(21) Appl. No.: 17/398,165

(22) Filed: Aug. 10, 2021

(65) Prior Publication Data

US 2022/0053363 A1      Feb. 17, 2022

(30) Foreign Application Priority Data

Aug. 14, 2020   (KR) .................. 10-2020-0102569
Aug. 24, 2020   (KR) .................. 10-2020-0106277
Jul. 30, 2021   (KR) .................. 10-2021-0100449

(51) Int. Cl.
*H04W 28/02*   (2009.01)

(52) U.S. Cl.
CPC ... *H04W 28/0263* (2013.01); *H04W 28/0205* (2013.01); *H04W 28/0268* (2013.01)

(58) Field of Classification Search
CPC ......... H04W 28/0263; H04W 28/0205; H04W 28/0268; H04W 36/0011; H04W 36/0019
See application file for complete search history.

(56) References Cited

U.S. PATENT DOCUMENTS

2021/0099341 A1\* 4/2021 Moon ................... H04J 3/0667
2022/0046731 A1\* 2/2022 Talebi Fard .......... H04L 47/724
2022/0060416 A1\* 2/2022 Zhu ........................ H04L 45/74

FOREIGN PATENT DOCUMENTS

KR   10-2019-0049508 A   5/2019
KR   10-2020-0039234 A   4/2020

OTHER PUBLICATIONS

3GPP, "Technical Specification Group Services and System Aspects; Study on enhanced support of Industrial Internet of Things (IIoT) in the 5G System (5GS)", (Release 17), 3GPP TR 23.700-20, V0.4.0 (Jun. 2020).

(Continued)

*Primary Examiner* — Omer S Mian
(74) *Attorney, Agent, or Firm* — LRK Patent Law Firm

(57) ABSTRACT

A 5G system operating as a Time Sensitive Network (TSN) bridge and a traffic transmission method are provided. The traffic transmission method includes receiving, by a User Plane Function (UPF), a traffic transmission type information from a Session Management Function (SMF); determining, by the UPF, whether a Time Sensitive Communication (TSC) traffic incoming the TSN bridge is a UE-UE TSC traffic based on the traffic transmission type information; and when it is determined that the TSC traffic incoming the TSN bridge is the UE-UE TSC traffic, performing, by the UPF, local switching between Protocol Data Unit (PDU) sessions for transmitting UE-UE TSC traffic.

14 Claims, 10 Drawing Sheets

(56) References Cited

OTHER PUBLICATIONS

ETRI, "KR #2, Sol #12: Update to clarify UE-UE TSC communication", 3GPP TSG-WG SA2 Meeting #140 e-meeting, S2-2005447, Elbonia, Aug. 19-Sep. 5, 2020.
Huawei et al., "KI#2 Supporting UE-UE TSC", 3GPP TSG-WG SA2 Meeting #143E e-meeting, S2-2102021, Elbonia, Feb. 24-Mar. 9, 2021.
Tencent, "PDU Session Establishment for TSC", 3GPP TSG SA WG2 #134, 3GPP (Jun. 18, 2019), S2-1907547.

\* cited by examiner

5G SYSTEM OPERATING AS TSN BRIDGE AND TRAFFIC TRANSMISSION METHOD

CROSS-REFERENCE TO RELATED APPLICATIONS

This application claims priority to and the benefit of Korean Patent Application No. 10-2020-0102569 filed in the Korean Intellectual Property Office on Aug. 14, 2020, Korean Patent Application No. 10-2020-0106277 filed in the Korean Intellectual Property Office on Aug. 24, 2020, and Korean Patent Application No. 10-2021-0100449 filed in the Korean Intellectual Property Office on Jul. 30, 2021, the entire contents of which are incorporated herein by reference.

BACKGROUND OF THE DISCLOSURE

1. Field of the Disclosure

The present disclosure relates to a traffic processing method for efficient Time Sensitive Communication (TSC) in a 5G network, specifically, a transmission method of time sensitive traffic in a 5G system operating as a Time-Sensitive Network (TSN) bridge.

2. Description of Related Art

In 3rd Generation Partnership Project (3GPP) SA2, in order to meet the requirements for the application of various vertical industries of the 5G system, standardization for the 5G system supporting TSC has begun in Rel-16. According to 3GPP TS 23.501, the 5G system is defined as one logical TSN bridge in order to provide a vertical service by interworking the 5G system with the TSN network. Later, in Rel-17, which extends the features in Rel-16, by proceeding with FS_IIoT (TR 23.700-20, Study on enhanced support of Industrial Internet of Things (IIoT) in the 5G System (5GS)) as a study item, standardization for additional features of the 5G system that provides high-reliability, low-latency and definitive-latency guarantees is in progress. The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide a traffic processing method capable of optimized transmission of TSC traffic based on a traffic transmission type for efficient TSC traffic transmission in a 5G system.

An example embodiment of the present disclosure provides a traffic transmission method of a 5G system operating as a Time Sensitive Network (TSN) bridge, the method including: receiving, by a User Plane Function (UPF), a traffic transmission type information from a Session Management Function (SMF); determining, by the UPF, whether a Time Sensitive Communication (TSC) traffic incoming the TSN bridge is a UE-UE TSC traffic based on the traffic transmission type information; and when it is determined that the TSC traffic incoming the TSN bridge is the UE-UE TSC traffic, performing, by the UPF, local switching between Protocol Data Unit (PDU) sessions for transmitting UE-UE TSC traffic.

According to an embodiment of the present disclosure, the performing the local switching includes: determining, by the UPF, UE-UE transmission of the TSC traffic using a Packet Detection Rule (PDR)/Forwarding Action Rule (FAR); and performing, by the UPF, local switching between PDU sessions for UE-UE transmission of the TSC traffic using a PDR/FAR information of the PDU session.

According to an embodiment of the present disclosure, the receiving the traffic transmission type information includes: receiving, by the UPF, the traffic transmission type information from the SMF using an N4 Session Establishment procedure.

According to an embodiment of the present disclosure, the receiving the traffic transmission type information includes: receiving, by the UPF, the traffic transmission type information from the SMF using an N4 Session Modification procedure.

According to an embodiment of the present disclosure, the receiving the traffic transmission type information includes: receiving, by the UPF, the traffic transmission type information set in a Destination Interface field of the FAR from the SMF.

According to an embodiment of the present disclosure, the receiving the traffic transmission type information includes: receiving, by the UPF, the traffic transmission type information set in a Source Interface field of the PDR from the SMF.

According to an embodiment of the present disclosure, the receiving the traffic transmission type information includes: receiving, by the UPF, the traffic transmission type information set as a TSC information from the SMF.

According to an embodiment of the present disclosure, the traffic transmission type information includes: a predetermined value indicating that the TSC traffic incoming the TSN bridge is the UE-UE TSC traffic.

Another embodiment of the present disclosure provides a network entity of a 5G system operating as a TSN bridge, the network entity including: a network interface configured to receive a traffic transmission type information from other network entity; and a processor configured to determine whether a TSC traffic incoming to the TSN bridge is a UE-UE TSC traffic based on the traffic transmission type information, and when it is determined that the TSC traffic incoming the TSN bridge is the UE-UE TSC traffic, perform local switching between PDU sessions for transmitting UE-UE TSC traffic.

According to an embodiment of the present disclosure, the processor determines UE-UE transmission of the TSC traffic using a PDR/FAR, and performs local switching between PDU sessions for UE-UE transmission of the TSC traffic using a PDR/FAR information of the PDU session.

According to an embodiment of the present disclosure, the network interface receives the traffic transmission type information from the other network entity using an N4 Session Establishment procedure.

According to an embodiment of the present disclosure, the network interface receives the traffic transmission type information from the other network entity using an N4 Session Modification procedure.

According to an embodiment of the present disclosure, the network interface receives the traffic transmission type information set in a Destination Interface field of the FAR from the other network entity.

According to an embodiment of the present disclosure, the network interface receives the traffic transmission type information set in a Source Interface field of the PDR from the other network entity.

According to an embodiment of the present disclosure, the network interface receives the traffic transmission type information set as a TSC information from the other network entity.

According to an embodiment of the present disclosure, the traffic transmission type information includes: a predetermined value indicating that the TSC traffic incoming the TSN bridge is the UE-UE TSC traffic.

DETAILED DESCRIPTION OF THE EMBODIMENTS

Figure 1:
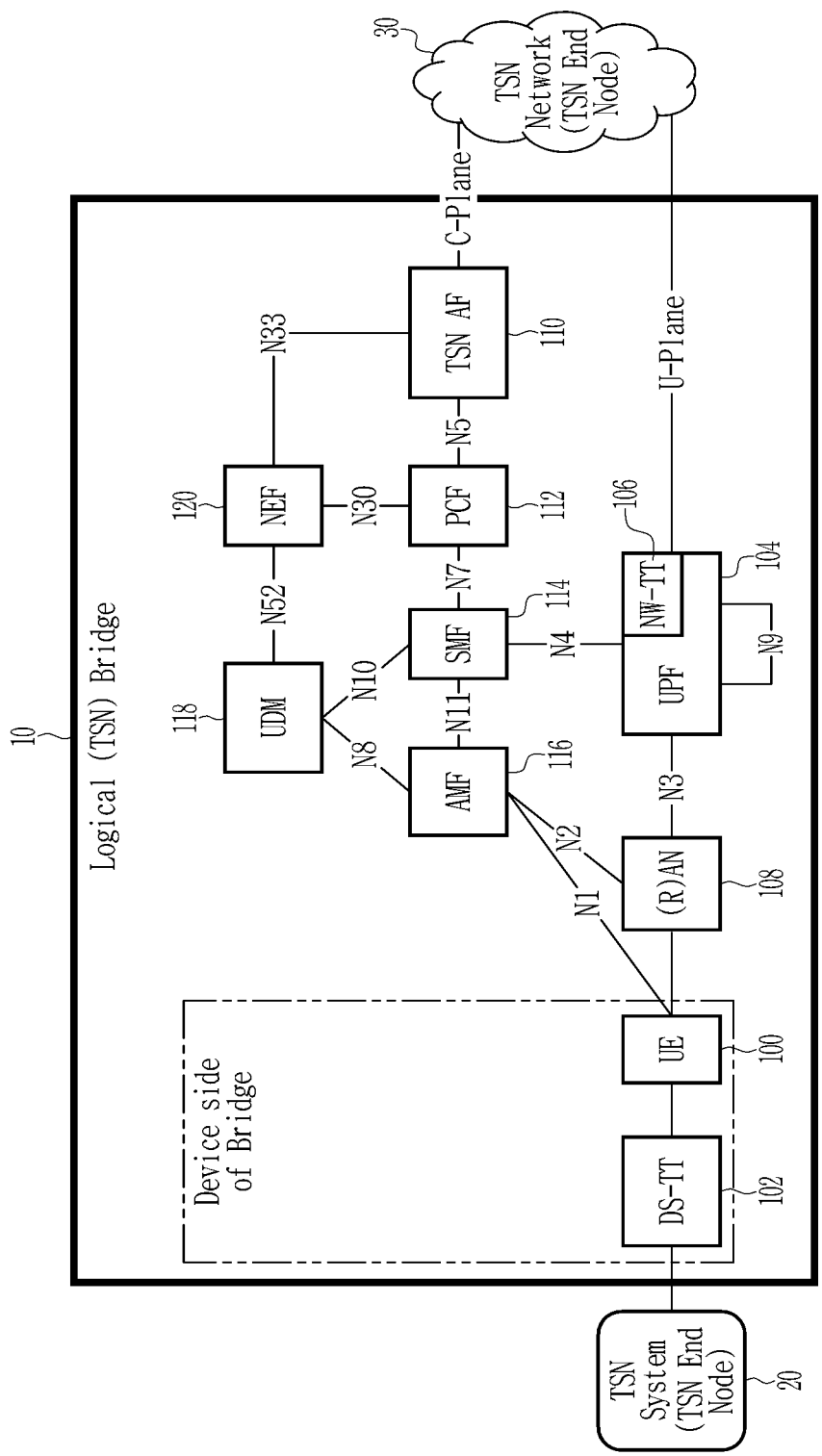
FIG. 1 is a diagram illustrating a 5G system architecture operating as a TSN bridge.

Hereinafter, embodiments of the present disclosure will be described in detail with reference to the accompanying drawings so that those of ordinary skill in the art may easily implement the present disclosure. However, the present disclosure may be implemented in various different ways and is not limited to the embodiments described herein.

In the drawings, parts irrelevant to the description are omitted in order to clearly describe the present disclosure, and like reference numerals are assigned to like elements throughout the specification.

Throughout the specification and claims, unless explicitly described to the contrary, the word "comprise", and variations such as "comprises" or "comprising", will be understood to imply the inclusion of stated elements but not the exclusion of any other elements. In addition, terms such as " . . . unit", " . . . group", and "module" described in the specification mean a unit that processes at least one function or operation, and it can be implemented as hardware or software or a combination of hardware and software.

FIG. 1 is a diagram illustrating a 5G system architecture operating as a TSN bridge.

Referring to FIG. 1, a 5G system architecture operating as a TSN bridge may include a 5G system 10 operating as a logical TSN bridge, and a TSN system 20 and a TSN network 30 as TSN end nodes that exchange data and communicate with each other using the 5G system 10 as a TSN bridge.

That is, the architecture of FIG. 1 is an architecture extended to support TSC in the 5G system 10. The 5G system 10 operates as a TSN bridge for integration with an external TSN network, and translators (TTs) 102, 106 and a TSN Application Function (TSN AF) are added to the architecture including the existing a UE 100, an UPF 104, a Radio Access Network (RAN) 108, a Policy Control Function (PCF) 112, a SMF 114, an Access and Mobility Management Function (AMF) 116, a Unified Data Management (UDM) 118 and a Network Exposure Function (NEF) 120 for communication with the TSN network. The TSN translators 102, 106 for interworking with the TSN network may includes a DS-TT 102 and a NW-TT 106, and each DS-TT 102 and NW-TT 106 has ports for transmitting or receiving traffics for communication with the TSN network. In addition to the translators in a User Plane, the TSN AF 110 in a Control Plane communicates with a Centralized Network Configuration (CNC) of the TSN network to transmit and receive control information between the 5G system and the TSN network.

Specifically, the TSN-AF 110 may control the 5G system 10 by transmitting and receiving control information for the TSN network (e.g., CNC) and the 5G system 10 to operate as a logical TSN bridge, and the DS-TT 102 and the NW-TT 104 may be TSN translators that process TSC traffic through a transparent connection with the TSN system outside the 5G system 10 on the UE 100 side and the network side, respectively.

According to 3GPP TS 23.501 standard, in the architecture of FIG. 1, in Rel-16, TSC communication between the TSN end nodes is limited to only TSC communication between a TSN node connected to the UE 100/DS-TT 102 and a TSN node connected to the outside of the UPF 104/NW-TT 106, but in Rel-17, it has been extended to TSC communication between TSN nodes connected to UE 100/DS-TT 102 in one UPF 104/NW-TT 106. The UE-UE TSC communication referred to in the present disclosure refers to communication in which TSC traffic is transmitted between two TSN nodes under an arbitrary UE 100/DS-TT 102 existing in the same UPF 104/NW-TT 106.

Figure 2:
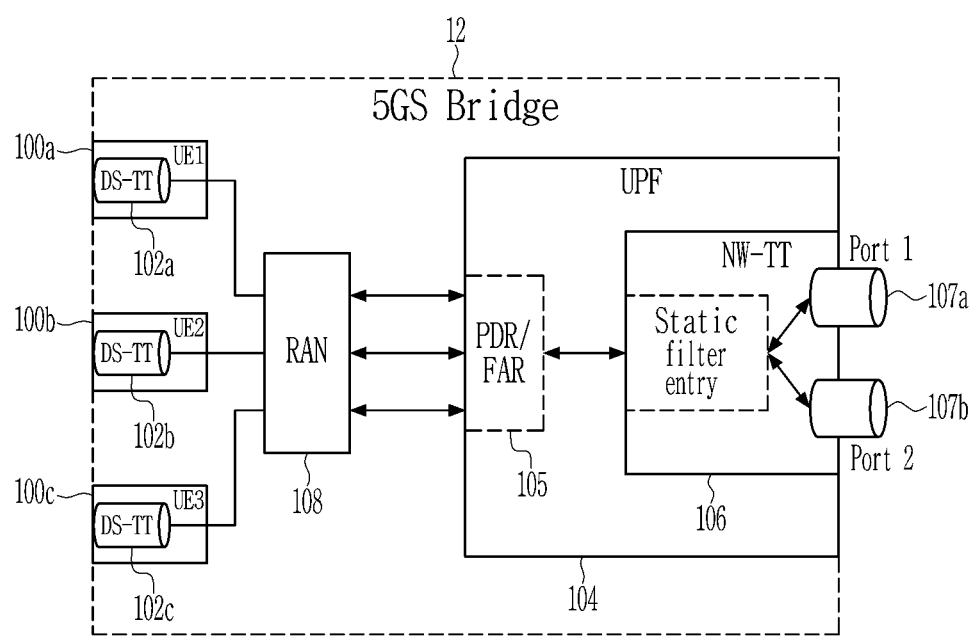
FIG. 2 is a diagram illustrating a conventional TSC traffic processing flow.

FIG. 2 is a diagram illustrating a conventional TSC traffic processing flow.

Referring to FIG. 2, a 5G system bridge (or a TSN bridge) 12 for processing TSC traffic may include a plurality of UEs 100a, 100b, 100c, a plurality of DS-TTs 102a, 102b, 102c, a UPF 104, a NW-TT 106 and a RAN 108.

The UPF 104 may process a user traffic of a PDU session. To this end, the UPF 104 may include a PDR/FAR 105 used for detecting and forwarding of packets belonging to the session. Here, the PDR may include information for classifying traffic arriving at the UPF 104, and the FAR may include information on whether to apply forwarding, dropping, or buffering to the traffic identified by the PDR. For more detail on this, refer to section 5.8 of 3GPP TS 23.501.

Meanwhile, the NW-TT 106 may transmit TSC traffic to a specific port within the TSN bridge 12, to this end, the NW-TT 106 may receive a static filter entry from the TSN-AF 110 through 5G internal signaling.

Referring to FIG. 2, a processing flow of TSC traffic flowing into the TSN bridge 12 will be briefly described as follows. All TSC traffic received from the plurality of DS-TTs 102a, 102b, 102c or ports 107a, 107b of the TSN network must go through the NW-TT 106. Accordingly, based on the static filter entry, the NW-TT 106 may transmit the received TSC traffic to an external TSN network when the received TSC traffic matches the ports 107a, 107b of the NW-TT 106, when there is no match, the NW-TT 106 may forward the received TSC traffic to the UPF 104 and transmit it to the target DS-TT through the PDR/FAR 105.

To explain this in more detail, the TSC traffic incoming the 5G system bridge (or the TSN bridge) 12 may be divided into three transmission types: an uplink TSC traffic, a downlink TSC traffic, and a UE-UE TSC traffic. Here, the uplink TSC traffic may be the TSC traffic transmitted from the UEs 100a, 100b, 100c to the UPF 104; the downlink TSC traffic may be the TSC traffic transmitted from the UPF 104 to the UEs 100a, 100b, 100c; and the UE-UE TSC traffic may be the TSC traffic transmitted between two TSN nodes under an arbitrary UE 100/DS-TT 102 existing in the same UPF 104/NW-TT 106, for example, the TSC traffic transmitted from the UE 100a to the UE 100b.

First, the uplink TSC traffic may arrive at UPF 104 via RAN 108 from UEs 100a, 100b, 100c/DS-TTs 102a, 102b, 102c, pass through the PDR/FAR 105 which include packet detection and forwarding rules, and then be delivered to the NW-TT 106. Then, the uplink TSC traffic, after passing through the static filter in the NW-TT 106, may be transmitted to the external TSN network through the determined ports 107a, 107b.

Then, regarding to the downlink TSC traffic, the TSC traffic coming from the TSN network to the TSN bridge 12 may pass through the static filter in the NW-TT 106. When the TSC traffic is determined to be transmitted to the ports of the DS-TTs 102a, 102b, 102c, the NW-TT 106 may transmit the TSC traffic to UPF 104, and the UPF 104, after going through the internal PDR/FAR 105, may determine a target PDU session and then transmit the TSC traffic to the UE/DS-TT corresponding to the target PDU session among the UEs 100a, 100b, 100c/DS-TTs 102a, 102b, 102c via the RAN 108.

Next, UE-UE TSC traffic processing goes through both uplink and downlink TSC traffic processing. The TSC traffic arriving at the UPF 104 from the UEs 100a, 100b, 100c/DS-TTs 102a, 102b, 102c via the RAN 108 may be delivered to the NW-TT 106 after going through the PDR/FAR 105 which include packet detection and forwarding rules unique to the UPF 104. After passing through the static filter in the NW-TT 106, when the TSC traffic is determined to be transmitted to the port in the DS-TT 102a, 102b, 102c in the UPF 104/NW-TT 106, the NW-TT 106 may transmit the TSC traffic to UPF 104, and the UPF 104, after going through the internal PDR/FAR 105, may determine a target PDU session and then transmit the TSC traffic to the UE/DS-TT corresponding to the target PDU session among the UEs 100a, 100b, 100c/DS-TTs 102a, 102b, 102c via the RAN 108.

However, this NW-TT-centered TSC traffic processing method must go through NW-TT regardless of the traffic transmission type (e.g., the uplink TSC traffic, the downlink TSC traffic, the UE-UE TSC traffic, etc.). This method has no problem in the case of TSC communication between the TSN node under the DS-TT/UE and the TSN node in the TSN network, but has a problem in that it is inefficient for the UE-UE TSC communication.

In order to solve this problem and realize efficient TSC traffic transmission, embodiments of the present disclosure may provide a method for transmitting information for allowing the SMF 114 to distinguish and transmit the UE-UE TSC traffic and other traffic (i.e., the uplink TSC traffic, the downlink TSC traffic) to the UPF 106, via the N4 interface between the SMF 114 and the UPF 106, and through this, the UE-UE TSC traffic can be efficiently processed without going through NW-TT.

Figure 3:
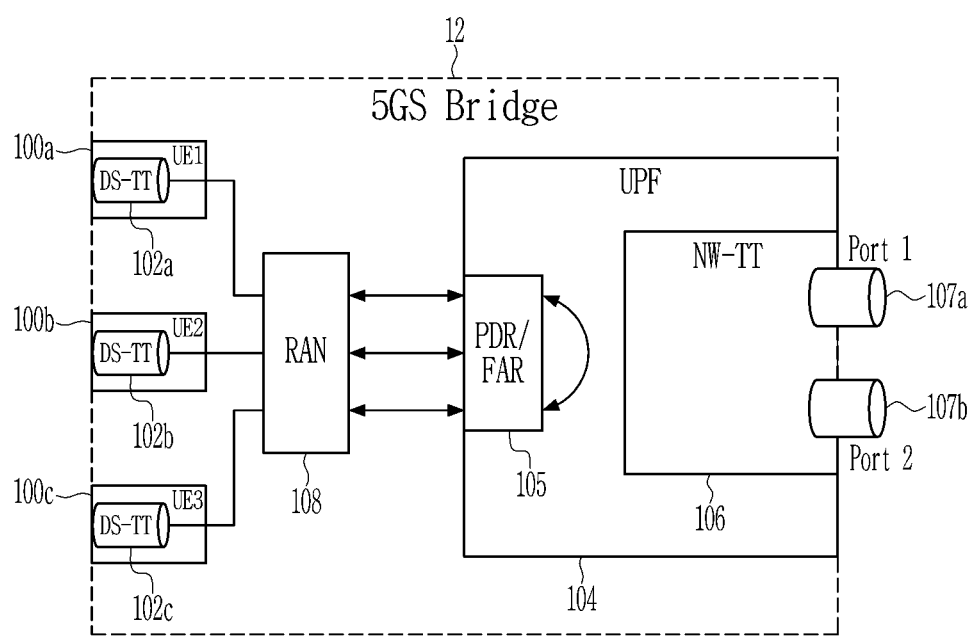
FIG. 3 is a diagram illustrating a method for transmitting UE-UE TSC traffic based on a transmission type of TSC traffic according to an embodiment of the present disclosure.

FIG. 3 is a diagram illustrating a method for transmitting UE-UE TSC traffic based on a transmission type of TSC traffic according to an embodiment of the present disclosure.

A traffic transmission method of a 5G system operating as a TSN bridge according to an embodiment of the present disclosure may include: receiving, by the UPF 104, a traffic transmission type information from the SMF 114, and determining, by the UPF 104, whether a TSC traffic incoming the TSN bridge 12 is a UE-UE TSC traffic base on the traffic transmission type information. Here, the traffic transmission type information may include a predetermined value indicating that the TSC traffic incoming the TSN bridge 12 is the UE-UE TSC traffic. Accordingly, if the predetermined value is set in the traffic transmission type information, it may indicate the UE-UE TSC traffic, and if not set, it may indicate an uplink TSC traffic or a downlink TSC traffic.

Of course, the traffic transmission type information may be implemented in other ways to distinguish the uplink TSC traffic, the downlink TSC traffic and the UE-UE TSC traffic. For example, the traffic transmission type information may be implemented to include any one of a first value indicating the uplink TSC traffic, a second value indicating the downlink TSC traffic, and a third value indicating the UE-UE TSC traffic.

Referring to FIG. 3, when it is determined that the TSC traffic incoming the TSN bridge is the UE-UE TSC traffic, the method may further include: performing, by the UPF 104, local switching between PDU sessions for transmitting UE-UE TSC traffic. Here, the performing the local switching may include: determining, by the UPF 104, UE-UE transmission of the TSC traffic using a PDR/FAR 105; and performing, by the UPF 104, local switching between PDU sessions for UE-UE transmission of the TSC traffic using a PDR/FAR information of the PDU session. In this case, the UE-UE TSC traffic may be transmitted to the target DS-TT without passing through the NW-TT 106.

Specifically, the UPF 104, for TSC traffic arriving at the UPF 104 via the RAN 108 from the source UE (e.g., 100a)/DS-TT (e.g., 102a), when the PDU session to which the TSC traffic belongs is implemented using a specific information element field of N4 FAR (e.g., a "Destination Interface" field of FAR) or a specific information element field of N4 PDR (e.g. a "Source Interface" field in PDR), which is a forwarding identifier of PDR/FAR 105, may check whether a value indicating UE-UE forwarding (e.g., "5G VN internal", "5G UEtoUE internal", or a predetermined value depending on the specific implementation purpose) is included in the information element, thereby indicating local switching. Details related thereto will be described later with reference to FIGS. 4A to 5B.

Alternatively, the UPF 104 may check whether a TSN information includes a value indicating UE-UE forwarding (e.g., "local switch"), thereby indicating local switching. Details related to this will be described later with reference to FIGS. 6 and 7.

When it is confirmed that the value included in the field of the PDR/FAR or the TSN information indicates local switching, the UPF 104 may find a target PDU session through the PDR/FAR 105 using a MAC address of target UE (e.g., 100b)/DS-TT (e.g., 102b), etc., and then transmit the UE-UE TSC traffic to the target UE (e.g., 100b)/DS-TT (e.g., 102b) via the RAN 108 using the forwarding information for the PDU session.

Hereinafter, embodiments in which the SMF 114 provides traffic transmission type information to the UPF 104 will be described with reference to FIG. 4A to FIG. 7.

The N4 Session Establishment and N4 Session Modification procedures described in FIG. 4A to FIG. 7 are N4 signaling procedures made between the SMF and the UPF among the PDU Session Establishment or PDU Session Modification procedures between the UE and the 5G core network, they can be used to create a new N4 session mapped to a PDU session, or to update the context of an already created N4 session. For more details on the PDU Session Establishment or PDU Session Modification procedure, refer to Sections 4.3.2 and 4.3.3 of 3GPP TS23.502.

FIG. 4A to 5B are diagrams for illustrating a method for setting a traffic transmission type using an N4 interface according to an embodiment of the present disclosure.

In this embodiment, the traffic transmission method of the 5G system operating as a TSN bridge may include: receiving, by the UPF 104, the traffic transmission type information from the SMF 114 using an N4 Session Establishment procedure or an N4 Session Modification procedure. In particular, the method may include: receiving, by the UPF 104, the traffic transmission type information set in a "Destination Interface" field of the FAR from the SMF; or receiving, by the UPF 104, the traffic transmission type information set in a "Source Interface" field of the PDR from the SMF.

Figure 4A:
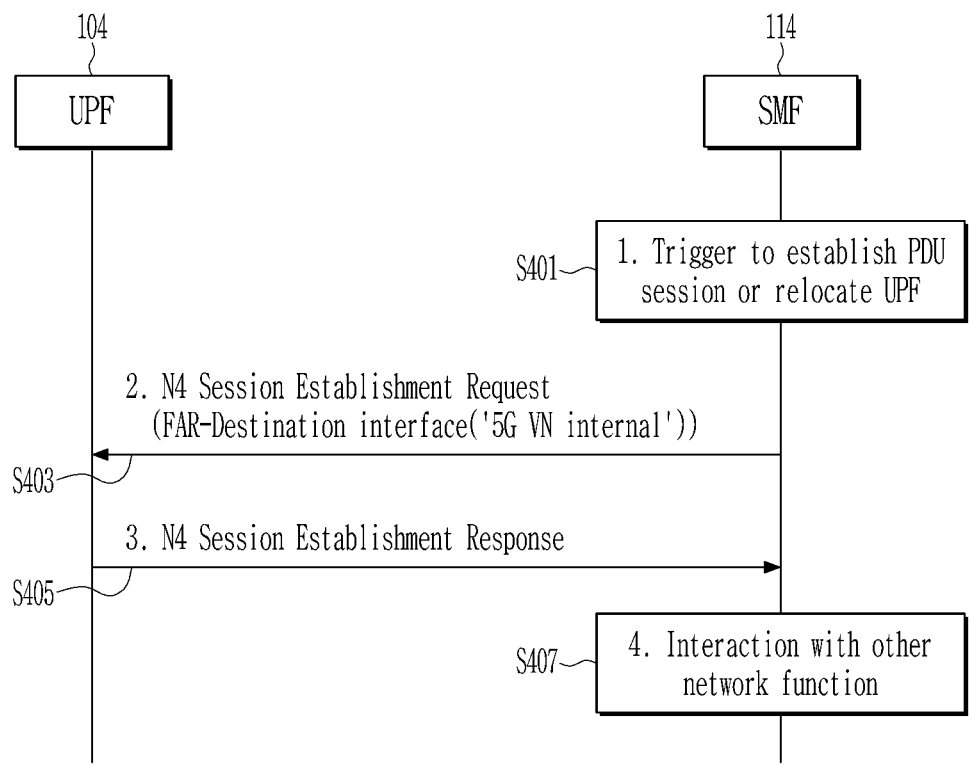
FIG. 4A to 5B are diagrams for illustrating a method for setting a traffic transmission type using an N4 interface according to an embodiment of the present disclosure.

Referring to FIG. 4A, the traffic transmission method using the N4 interface according to the present embodiment may include: triggering, by the SMF 114, to establish a PDU session or relocate an UPF S401; receiving, by the UPF 104, the N4 Session Establishment Request message from the SMF 114, with the traffic transmission type information set in the Destination Interface field of the FAR S403; transmitting, by the UPF 104, the N4 Session Establishment Response message to the SMF 114 S405; and performing, by the SMF 114, an interaction with other network function S407. In S403, when the value set in the Destination Interface field of the FAR is '5G VN internal', it may be interpreted as indicating local switching for UE-UE TSC traffic transmission. The value set in the Destination Interface field is not necessarily limited to '5G VN internal', and a value of '5G UEtoUE internal' may be set, or an arbitrary value appropriately defined according to a specific implementation purpose may be set. By using the value set in the Destination Interface field of the FAR, the SMF 114 may inform the UPF 104 that the TSC traffic received from the UE is a UE-UE TSC traffic, and the UPF 104 may forward the TSC traffic to the target UE to which the UE-UE TSC traffic will be transmitted in the UPF 104/NW-TT 106.

Figure 4B:
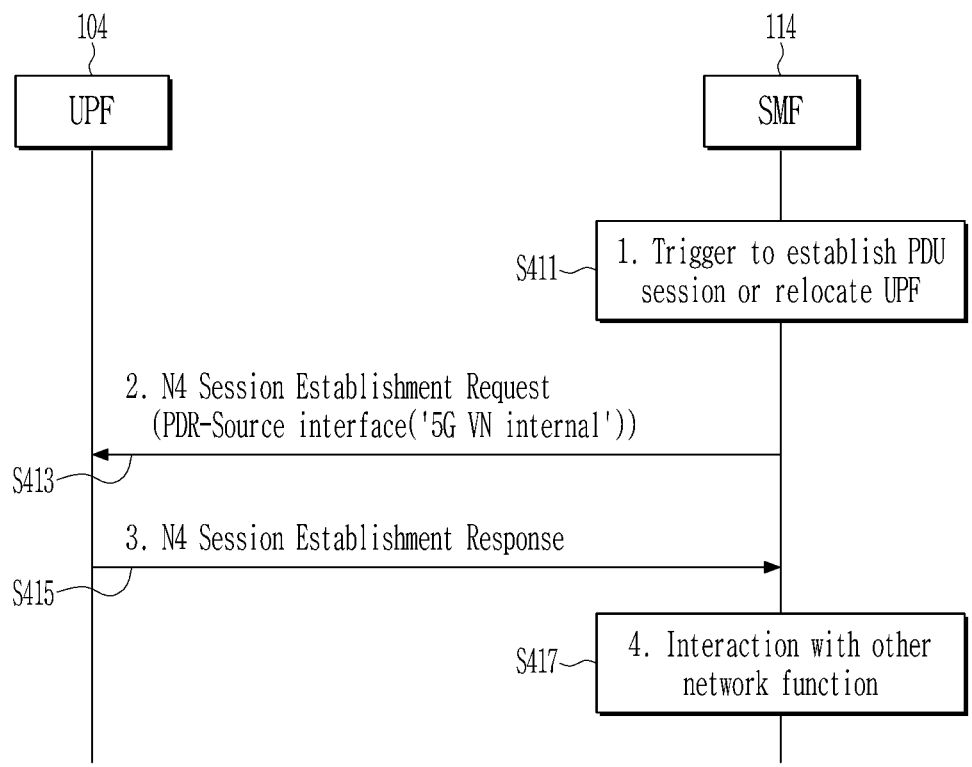

Next, referring to FIG. 4B, the traffic transmission method using the N4 interface according to the present embodiment may include: triggering, by the SMF 114, to establish a PDU session or relocate an UPF S411; receiving, by the UPF 104, the N4 Session Establishment Request message from the SMF 114, with the traffic transmission type information set in the Source Interface field of the PDR S413; transmitting, by the UPF 104, the N4 Session Establishment Response message to the SMF 114 S415; and performing, by the SMF 114, an interaction with other network function S417. In S413, when the value set in the Source Interface field of the PDR is '5G VN internal', it may be interpreted as indicating local switching for UE-UE TSC traffic transmission. As in the case of FIG. 4A, the value set in the Source Interface field is not necessarily limited to '5G VN internal', and a value of '5G UEtoUE internal' may be set, or an arbitrary value appropriately defined according to a specific implementation purpose may be set. By using the value set in the Source Interface field of the PDR, the SMF 114 may detect UE-UE TSC traffic from TSC traffic received from the UE, and determine a target UE to which the UE-UE TSC traffic will be transmitted.

Figure 5A:
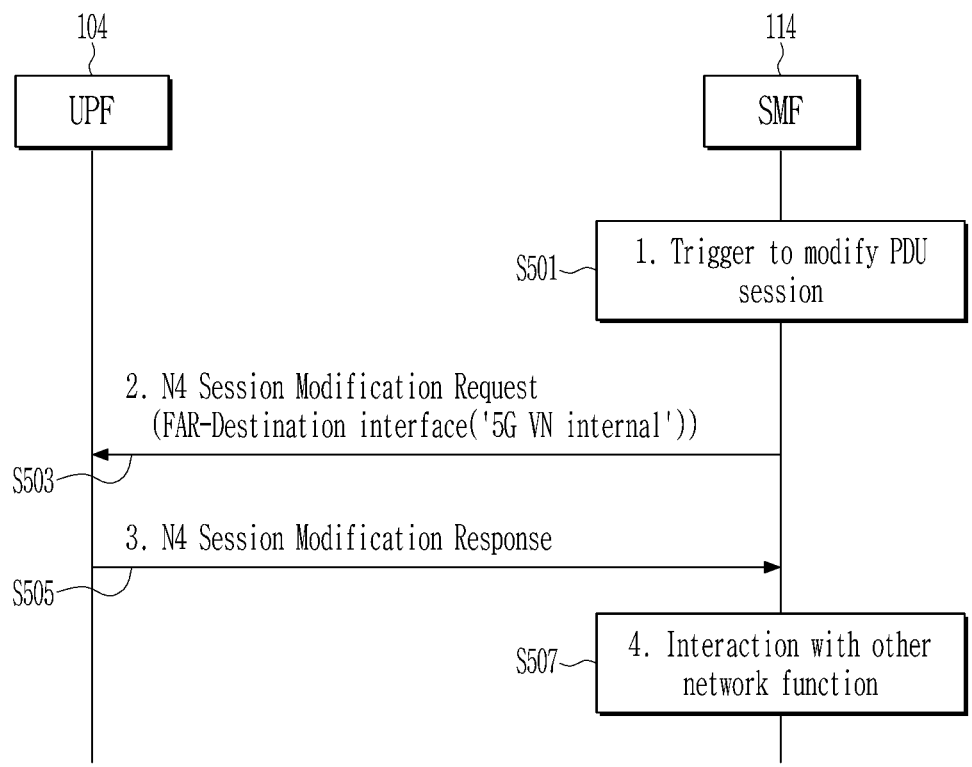

Meanwhile, referring to FIG. 5A, the traffic transmission method using the N4 interface according to the present embodiment may include: triggering, by the SMF 114, to establish a PDU session or relocate an UPF S501; receiving, by the UPF 104, the N4 Session Modification Request message from the SMF 114, with the traffic transmission type information set in the Destination Interface field of the FAR S503; transmitting, by the UPF 104, the N4 Session Modification Response message to the SMF 114 S505; and performing, by the SMF 114, an interaction with other network function S507. In S503, when the value set in the Destination Interface field of the FAR is '5G VN internal', it may be interpreted as indicating local switching for UE-UE TSC traffic transmission. As in the case of FIG. 4A, the value set in the Destination Interface field is not necessarily limited to '5G VN internal', and a value of '5G UEtoUE internal' may be set, or an arbitrary value appropriately defined according to a specific implementation purpose may be set. By using the value set in the Destination Interface field of the FAR, the SMF 114 may inform the UPF 104 that the TSC traffic received from the UE is a UE-UE TSC traffic, and the UPF 104 may forward the TSC traffic to the target UE to which the UE-UE TSC traffic will be transmitted in the UPF 104/NW-TT 106.

Figure 5B:
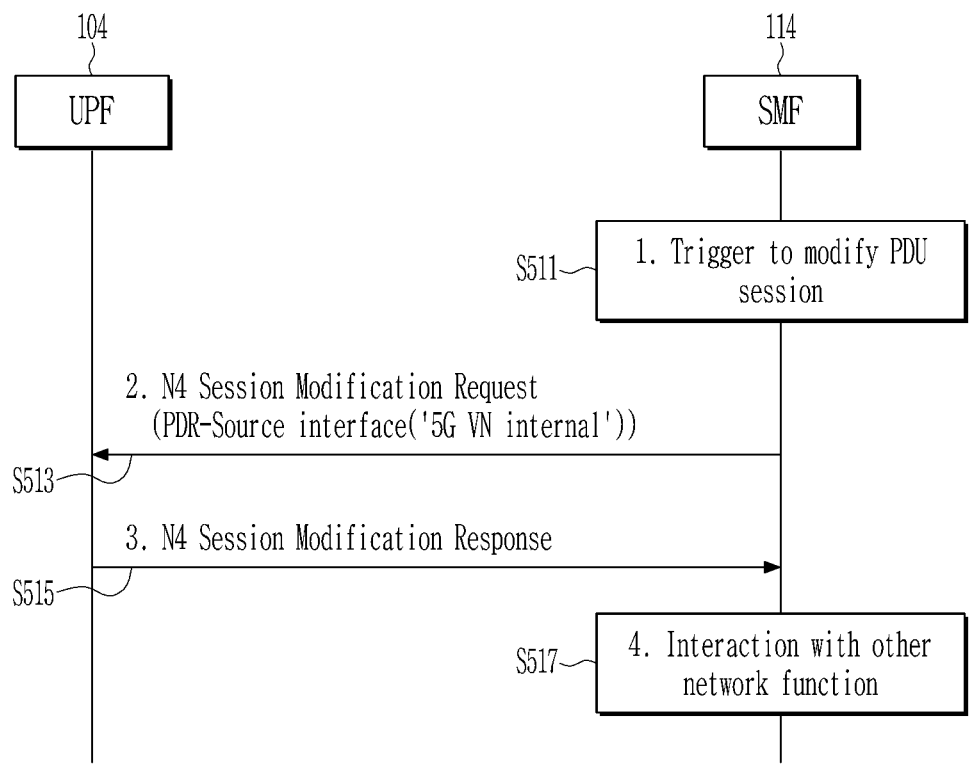

Next, referring to FIG. 5B, the traffic transmission method using the N4 interface according to the present embodiment may include: triggering, by the SMF 114, to establish a PDU session or relocate an UPF S511; receiving, by the UPF 104, the N4 Session Modification Request message from the SMF 114, with the traffic transmission type information set in the Source Interface field of the PDR S513; transmitting, by the UPF 104, the N4 Session Modification Response message to the SMF 114 S515; and performing, by the SMF 114, an interaction with other network function S517. In S513, when the value set in the Source Interface field of the PDR is '5G VN internal', it may be interpreted as indicating local switching for UE-UE TSC traffic transmission. As in the case of FIG. 4B, the value set in the Source Interface field is not necessarily limited to '5G VN internal', and a value of '5G UEtoUE internal' may be set, or an arbitrary value appropriately defined according to a specific implementation purpose may be set. By using the value set in the Source Interface field of the PDR, the SMF 114 may detect UE-UE TSC traffic from TSC traffic received from the UE, and determine a target UE to which the UE-UE TSC traffic will be transmitted.

Figure 6:
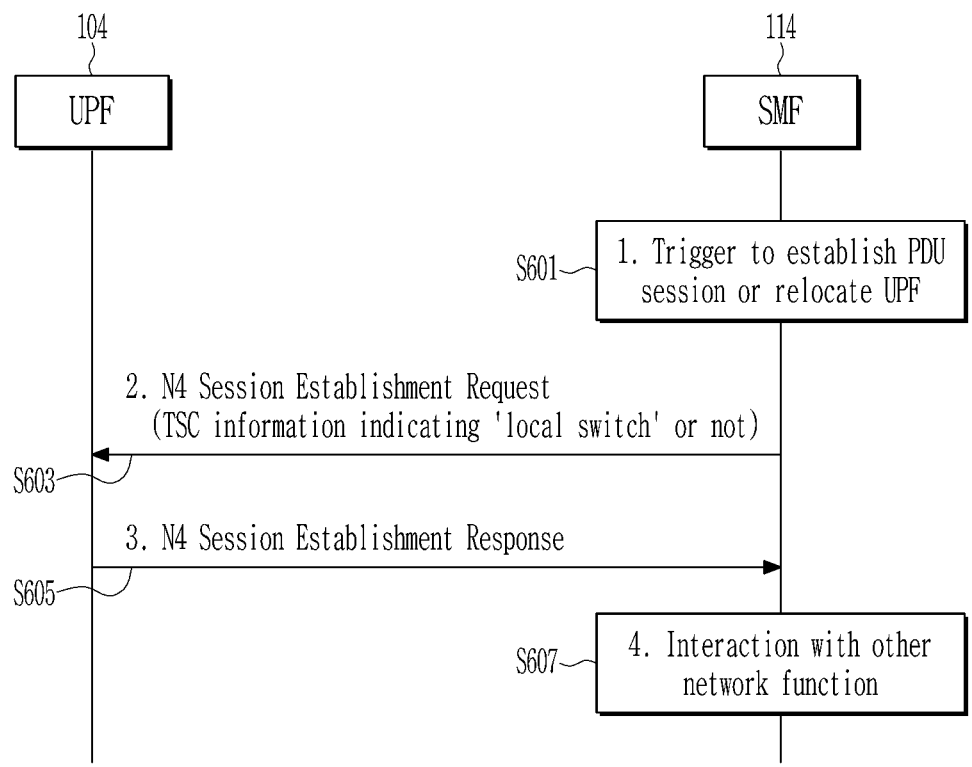
FIGS. 6 and 7 are diagrams for illustrating a method for setting a traffic transmission type using an N4 interface according to an embodiment of the present disclosure.
Figure 7:
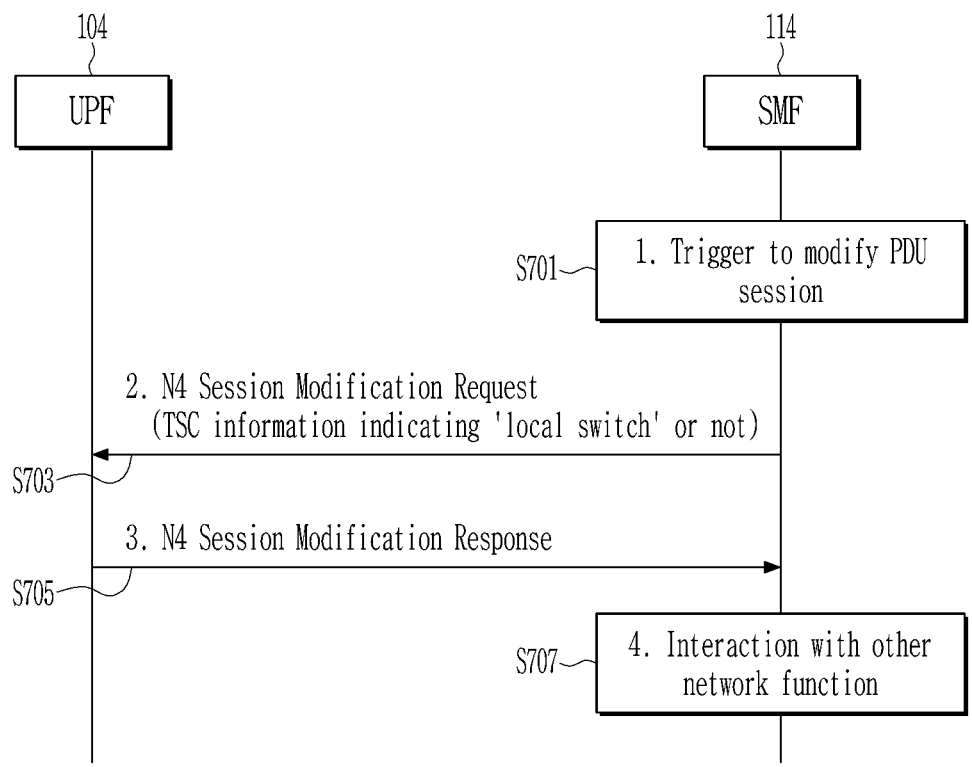

FIGS. 6 and 7 are diagrams for illustrating a method for setting a traffic transmission type using an N4 interface according to an embodiment of the present disclosure.

In this embodiment, the traffic transmission method of the 5G system operating as a TSN bridge may include: receiving, by the UPF 104, the traffic transmission type information from the SMF 114 using an N4 Session Establishment procedure or an N4 Session Modification procedure. In particular, the method may include: receiving, by the UPF 104, the traffic transmission type information set as a TSC information from the SMF 114.

Referring to FIG. 6, the traffic transmission method using the N4 interface according to the present embodiment may include: triggering, by the SMF 114, to establish a PDU session or relocate an UPF S601; receiving, by the UPF 104, the N4 Session Establishment Request message from the SMF 114, with the traffic transmission type information set as a TSC information S603; transmitting, by the UPF 104, the N4 Session Establishment Response message to the SMF 114 S605; and performing, by the SMF 114, an interaction with other network function S607. In S603, when the value set in the TSN information is 'local switch', it may be interpreted as indicating local switching for UE-UE TSC traffic transmission.

Next, referring to FIG. 7, the traffic transmission method using the N4 interface according to the present embodiment may include: triggering, by the SMF 114, to establish a PDU session or relocate an UPF S701; receiving, by the UPF 104, the N4 Session Modification Request message from the SMF 114, with the traffic transmission type information set as a TSC information S703; transmitting, by the UPF 104, the N4 Session Modification Response message to the SMF 114 S705; and performing, by the SMF 114, an interaction with other network function S707. In S703, when the value set in the TSN information is 'local switch', it may be interpreted as indicating local switching for UE-UE TSC traffic transmission.

Figure 8:
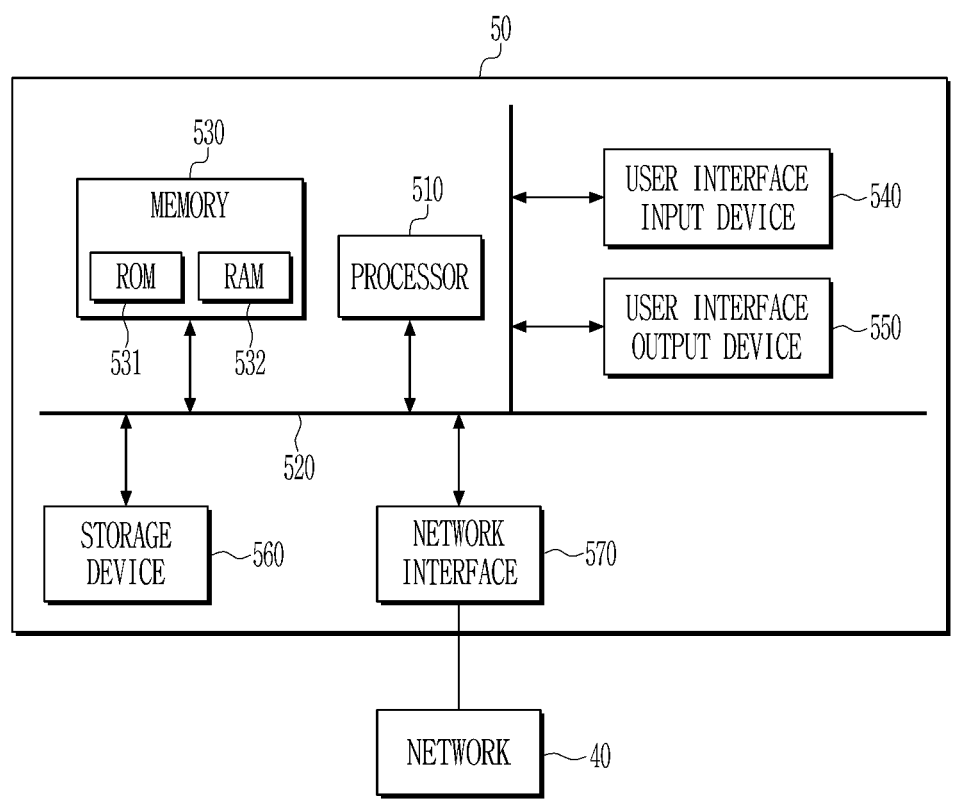
FIG. 8 is a block diagram illustrating a computing device according to an embodiment of the present disclosure.

FIG. 8 is a block diagram illustrating a computing device according to an embodiment of the present disclosure.

Referring to FIG. 8, a computing device 50 may be a network entity of a 5G system, for example, UE 100, DS-TT 102, UPF 104, NW-TT 106, RAN 108, TSN AF 110, PCF 112, SMF 114, AMF 116, UDM 118 and NEF 120, and the like. Also, a 5G system operating as a TSN bridge and a traffic transmission method according to embodiments of the present disclosure may be implemented using the computing device 50.

The computing device 50 includes at least one of a processor 510, a memory 530, a user interface input device 540, a user interface output device 550, and a storage device 560 communicating through a bus 520. The computing device 50 may also include a network 40, such as a network interface 570 that is electrically connected to a wireless network. The network interface 570 may transmit or receive signals with other entities through the network 40.

The processor 510 may be implemented in various types such as an application processor (AP), a central processing unit (CPU), and a graphic processing unit (GPU), and may be any semiconductor device which executes instructions stored in the memory 530 or the storage device 560. The processor 510 may be configured to implement the functions and methods described in FIG. 1 to FIG. 7.

The memory 530 and the storage device 560 may include various types of volatile or nonvolatile storage media. For example, the memory may include read-only memory (ROM) 531 and random access memory (RAM) 532. In an embodiment of the present disclosure, the memory 530 may be located inside or outside the processor 510, and the memory 530 may be connected to the processor 510 through various known means.

In addition, at least some of a 5G system operating as a TSN bridge and a traffic transmission method according to embodiments of the present disclosure may be implemented as a program or software executed on the computing device 50, and the program or software may be stored in a computer-readable medium.

In addition, at least some of a 5G system operating as a TSN bridge and a traffic transmission method according to embodiments of the present disclosure may be implemented with hardware that can be electrically connected to the computing device 50.

In particular, the network entities UE 100, DS-TT 102, UPF 104, NW-TT 106, RAN 108, TSN AF 110, and SMF 114 may perform the operations described with reference to FIG. 1 to FIG. 7.

For example, a network entity (i.e., UPF 104) of a 5G system operating as a TSN bridge, may include a network interface 570 configured to receive a traffic transmission type information from other network entity (i.e., SMF 114), and a processor 510 configured to determine whether a TSC traffic incoming to the TSN bridge is a UE-UE TSC traffic based on the traffic transmission type information, and when it is determined that the TSC traffic incoming the TSN bridge is the UE-UE TSC traffic, perform local switching between PDU sessions for transmitting UE-UE TSC traffic. In addition, the processor 510 and the network interface 570 may be implemented to perform the operations described with reference to FIG. 3 to FIG. 7.

According to the embodiments of the present disclosure described so far, in a 5G system operating as a TSN bridge, by setting PDR/FAR which is a TSC traffic control rule of UPF to process TSC traffic transmission between UE-UE within the same UPF differently from other transmission types, TSC traffic between UE-UE in UPF can be efficiently and easily transmitted without going through NW-TT.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A traffic transmission method of a 5G system operating as a Time Sensitive Network (TSN) bridge, the traffic transmission method comprising:
   receiving, by a User Plane Function (UPF), a traffic transmission type information from a Session Management Function (SMF);
   determining, by the UPF, whether a Time Sensitive Communication (TSC) traffic incoming the TSN bridge is a UE-UE TSC traffic based on the traffic transmission type information; and
   when it is determined that the TSC traffic incoming the TSN bridge is the UE-UE TSC traffic, performing, by the UPF, local switching between Protocol Data Unit (PDU) sessions for transmitting UE-UE TSC traffic,
   wherein the traffic transmission type information comprises a predetermined value indicating that the TSC traffic incoming the TSN bridge is the UE-UE TSC traffic.

2. The traffic transmission method of claim 1, wherein the performing the local switching comprises:
   determining, by the UPF, UE-UE transmission of the TSC traffic using a Packet Detection Rule (PDR)/Forwarding Action Rule (FAR); and
   performing, by the UPF, local switching between PDU sessions for UE-UE transmission of the TSC traffic using a PDR/FAR information of the PDU session.

3. The traffic transmission method of claim 1, wherein the receiving the traffic transmission type information comprises:
   receiving, by the UPF, the traffic transmission type information from the SMF using an N4 Session Establishment procedure.

4. The traffic transmission method of claim 1, wherein the receiving the traffic transmission type information comprises:
   receiving, by the UPF, the traffic transmission type information from the SMF using an N4 Session Modification procedure.

5. The traffic transmission method of claim 1, wherein the receiving the traffic transmission type information comprises:
   receiving, by the UPF, the traffic transmission type information set in a Destination Interface field of the FAR from the SMF.

6. The traffic transmission method of claim 1, wherein the receiving the traffic transmission type information comprises:
   receiving, by the UPF, the traffic transmission type information set in a Source Interface field of the PDR from the SMF.

7. The traffic transmission method of claim 1, wherein the receiving the traffic transmission type information comprises:
   receiving, by the UPF, the traffic transmission type information set as a TSC information from the SMF.

8. A network entity of a 5G system operating as a TSN bridge, the network entity comprising:
   a User Plane Function (UPF) configured to receive a traffic transmission type information from a Session Management Function (SMF); and
   a processor of the UPF configured to determine whether a TSC traffic incoming to the TSN bridge is a UE-UE TSC traffic based on the traffic transmission type information, and
   when it is determined that the TSC traffic incoming the TSN bridge is the UE-UE TSC traffic, perform, by the UPF, local switching between PDU sessions for transmitting UE-UE TSC traffic;
   wherein the traffic transmission type information comprises a predetermined value indicating that the TSC traffic incoming the TSN bridge is the UE-UE TSC traffic.

9. The network entity of claim 8, wherein the processor determines UE-UE transmission of the TSC traffic using a PDR/FAR, and performs local switching between PDU sessions for UE-UE transmission of the TSC traffic using a PDR/FAR information of the PDU session.

10. The network entity of claim 8, wherein the UPF receives the traffic transmission type information from the other network entity using an N4 Session Establishment procedure.

11. The network entity of claim 8, wherein the UPF receives the traffic transmission type information from the other network entity using an N4 Session Modification procedure.

12. The network entity of claim 8, wherein the UPF receives the traffic transmission type information set in a Destination Interface field of the FAR from the other network entity.

13. The network entity of claim 8, wherein the UPF receives the traffic transmission type information set in a Source Interface field of the PDR from the other network entity.

14. The network entity of claim 8, wherein the UPF receives the traffic transmission type information set as a TSC information from the other network entity.

* * * * *